US011133979B2

United States Patent
Tidestav

(10) Patent No.: US 11,133,979 B2
(45) Date of Patent: Sep. 28, 2021

(54) COMPLETION OF SCELL BEAM FAILURE RECOVERY

(71) Applicant: Telefonaktiebolaget LM Ericsson (publ), Stockholm (SE)

(72) Inventor: Claes Tidestav, Bålsta (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/990,340

(22) Filed: Aug. 11, 2020

(65) Prior Publication Data

US 2021/0051057 A1    Feb. 18, 2021

Related U.S. Application Data

(60) Provisional application No. 62/885,850, filed on Aug. 13, 2019.

(51) Int. Cl.
*H04L 12/24* (2006.01)
*H04W 76/19* (2018.01)
(Continued)

(52) U.S. Cl.
CPC ........ *H04L 41/0668* (2013.01); *H04L 1/1812* (2013.01); *H04W 72/14* (2013.01); *H04W 76/19* (2018.02)

(58) Field of Classification Search
CPC . H04L 41/0668; H04L 1/1812; H04L 1/1829; H04L 1/1864; H04L 1/1896; H04W 72/14; H04W 76/19
See application file for complete search history.

(56) References Cited

U.S. PATENT DOCUMENTS

| 2014/0219196 A1* | 8/2014 | Patel | H04L 1/1812 |
| | | | 370/329 |
| 2015/0180615 A1* | 6/2015 | Yang | H04L 1/1835 |
| | | | 370/328 |

(Continued)

OTHER PUBLICATIONS

Author Unknown, "Technical Specification Group Radio Access Network; NR; Physical layer procedures for control (Release 15)," Technical Specification 38.213, Version 15.6.0, 3GPP Organizational Partners, Jun. 2019, 107 pages.

(Continued)

*Primary Examiner* — Walli Z Butt
(74) *Attorney, Agent, or Firm* — Withrow & Terranova, PLLC

(57) ABSTRACT

Systems and methods for beam failure recovery are disclosed. In particular, embodiments of a method performed by a wireless device for beam failure recovery and corresponding embodiments of a wireless device are disclosed. In one embodiment, a method performed by a wireless device for beam failure recovery comprises transmitting, to a base station, an uplink transmission comprising beam failure recovery information, where the uplink transmission is associated with a particular Hybrid Automatic Repeat Request (HARQ) process. The method further comprises receiving, from the base station, an uplink grant for the particular HARQ process, where the uplink grant comprises a new data indicator. The method further comprises determining, based on the new data indicator comprised in the uplink grant, that a beam failure recovery procedure related to the beam failure recovery information is complete.

26 Claims, 6 Drawing Sheets

An example transmission of SCell BFR

(51) Int. Cl.
    *H04L 1/18*    (2006.01)
    *H04W 72/14*    (2009.01)

(56) References Cited

U.S. PATENT DOCUMENTS

| | | | | |
|---|---|---|---|---|
| 2020/0266876 A1* | 8/2020 | Yu | ......................... | H04B 7/0695 |
| 2020/0267048 A1* | 8/2020 | Yu | ......................... | H04L 1/1822 |
| 2020/0275484 A1* | 8/2020 | Xu | .................... | H04W 72/0453 |

OTHER PUBLICATIONS

Ericsson, "Tdoc R2-1803195: Beam Failure Recovery in SCell," 3GPP TSG-RAN WG2#101, Feb. 26-Mar. 2, 2018, 4 pages, Athens, Greece.
Huawei, et al., "R1-1907533: Beam failure recovery for Scell with new beam information," 3GPP TSG RAN WG1 Meeting #97, May 13-17, 2019, 7 pages, Reno, Nevada.
Samsung, "R2-1804303: MAC Impacts: Beam Failure Recovery for SCell," 3GPP TSG-RAN2 101bis, Apr. 16-20, 2018, 8 pages, Sanya, China.
International Search Report and Written Opinion for International Patent Application No. PCT/SE2020/050773, dated Nov. 12, 2020, 13 pages.

\* cited by examiner

*An example transmission of SCell BFR*

*An example transmission of SCell BFR*

COMPLETION OF SCELL BEAM FAILURE RECOVERY

RELATED APPLICATIONS

This application claims the benefit of provisional patent application Ser. No. 62/885,850, filed Aug. 13, 2019, the disclosure of which is hereby incorporated herein by reference in its entirety.

TECHNICAL FIELD

The present disclosure relates to beam failure recovery in a cellular communications system.

BACKGROUND

Carrier Aggregation

Carrier aggregation implies that the User Equipment (UE) is assigned more than one carrier, and that data communication may be performed over more than one carrier. The carriers are at least to some extent operated independently. Furthermore, the link quality of the carriers is in many cases independent. The different carriers are sometimes called Component Carriers (CCs).

In the Third Generation Partnership Project (3GPP) specification, the different CCs are known as different serving cells. A UE configured for carrier aggregation has one Primary Cell (PCell) and one or more Secondary Cells (SCells). Although the data is transmitted over all the serving cells, many procedures only rely on the PCell.

Beam Recovery

In 3GPP New Radio (NR) Release 15, a procedure called beam recovery has been defined for the PCell. In beam recovery, an RRC_CONNECTED UE performs measurements associated to the quality of the serving link and, if that quality goes below a given threshold, the UE performs beam recovery. The procedure aims to solve the situation where the transmit (TX) and receive (RX) beams of the NR base station (called a gNodeB or gNB) and the UE have become misaligned, but where there are additional beams that could be used to maintain the connection between the gNB and the UE.

The beam failure recovery procedure includes the following aspects:
1. Beam Failure Detection: Here, the UE monitors a certain periodic Reference Signal (RS) to estimate the quality of the serving link. Once the quality of that link falls below a certain threshold, the UE initiates beam recovery.
2. New Candidate Beam Identification: Once beam failure has been detected, the UE tries to identify a new beam that would provide adequate quality. The UE then searches for a specific RS, which is transmitted from the same node, but in different candidate beams. During this search procedure, the UE may also change its RX beam.
3. Beam Failure Recovery Request Transmission: The UE transmits a Physical Random Access Channel (PRACH) preamble in the uplink (UL). The gNB is prepared to receive the UL signal in these UL resources, and can determine which candidate beam the UE selected based on the received UL signal.
4. When the gNB has received the beam failure recovery request, it sends a downlink (DL) response to indicate to the UE that it received the request, using the knowledge of the new beam.
5. The UE monitors the gNB response for a beam failure recovery request. Once the UE has successfully received the response, the beam recovery is complete. At this point in time, the UE changes the way it performs the Physical Downlink Control Channel (PDCCH) monitoring.

Note that after declaring beam failure in step 1, the UE considers the connection with the network to be lost and acts to restore the link.

Note that during all discussions in 3GPP, the term "beam recovery" is used, but in the specification (3GPP Technical Specification (TS) 38.213), the term "link recovery" is used. As such, these terms are used interchangeably herein (i.e., have the same meaning herein).

Beam Recovery for SCell

For Release 16, beam recovery for an SCell is being defined. Here, the first two steps described in in the Beam Recovery section above are reused. In particular, if configured, the UE still performs beam failure detection by monitoring a periodic reference signal and searches for new beams. However, the remainder of the SCell beam recovery procedure is different compared to the PCell beam recovery. It is assumed that the PCell is still operational, and the UE can communicate over the PCell.

For SCell beam recovery, it has been agreed that after beam failure detection, the UE sends a scheduling request to inform the network that at least one of the SCells has failed. If the UE already has a grant to transmit UL data, this step may be unnecessary. When receiving this scheduling request, the network grants the UE UL resources to transmit a Medium Access Control (MAC) Control Element (CE) message that contains information about which SCell failed and information about a new suitable beam where the communication can be reestablished. For future reference, this message will be denoted the beam failure recovery information message or BFRI message.

MAC CE

One way to convey control information between the network and the UE in NR is to use MAC CEs. This special MAC structure is implemented as a special bit string in the Logical Channel Identifier (ID) (LCID) field of the MAC header. The MAC CEs are transmitted over the Downlink or Uplink Shared Channel (UL-SCH or DL-SCH) and are thus protected by Hybrid Automatic Repeat Request (HARQ).

HARQ Retransmissions for Physical Uplink Shared Channel (PUSCH) in NR

NR relies on HARQ to improve performance of physical channels. With HARQ, the receiver requests a retransmission of a packet if it is unable to decode it correctly. Each transmission is associated with a Cyclic Redundancy Check (CRC) to facilitate such error detection. In most cases, the receiver sends an Acknowledgement (ACK) or a Negative ACK (NACK) to the transmitter to inform the transmitter about the status of a transmission.

For the PUSCH in NR, the receiver (i.e., the base station) performs error detection using such a CRC. However, unlike Long Term Evolution (LTE), there is no explicit ACK/

NACK transmitted. Instead, the base station schedules each retransmission explicitly. Each UL grant includes information about which HARQ process should be used for the corresponding transmission and if the transmission should include a retransmission of the previous transmission, or if it should include "new data"— there is a specific bit in the scheduling Downlink Control Information (DCI) called "new data." If that bit indicates "new data," the UE transmits new data, otherwise it retransmits the previous packet.

Problems with Existing Solutions

There currently exist certain challenge(s). In particular, beam failure recovery for SCells in NR is new and results in new issues that need to be addressed.

SUMMARY

Systems and methods for beam failure recovery are disclosed. In particular, embodiments of a method performed by a wireless device for beam failure recovery and corresponding embodiments of a wireless device are disclosed. In one embodiment, a method performed by a wireless device for beam failure recovery comprises transmitting, to a base station, an uplink (UL) transmission comprising beam failure recovery information, where the UL transmission is associated with a particular Hybrid Automatic Repeat Request (HARQ) process. The method further comprises receiving, from the base station, a UL grant for the particular HARQ process, where the UL grant comprises a new data indicator. The method further comprises determining, based on the new data indicator comprised in the UL grant, that a beam failure recovery procedure related to the beam failure recovery information is complete. In this manner, the wireless device is enabled to determine when the beam failure recovery procedure is complete, even when no HARQ acknowledgement is sent.

In one embodiment, the method further comprises, upon determining that the beam failure recovery procedure is complete, performing one or more actions associated with successful completion of the beam failure recovery procedure.

In one embodiment, the beam failure recovery procedure is a Secondary Cell (SCell) beam failure recovery procedure.

In one embodiment, the method further comprises determining, based on the new data indicator comprised in the UL grant, that the beam failure recovery information was successfully received by the base station.

In one embodiment, the new data indicator is a bit in the UL grant that indicates that the UL grant schedules new data and not retransmitted data. In one embodiment, the new data indicator indicates that the UL grant schedules new data when a value of the bit is toggled.

In one embodiment, the beam failure recovery information comprises information indicating a cell of the beam failure and a new beam suitable for reestablishing the communication.

In one embodiment, the UL transmission comprising the beam failure recovery information is a Medium Access Control (MAC) Control Element (CE) message.

In one embodiment, the UL grant is a UL grant of a predefined minimum size larger than zero bits. In another embodiment, the UL grant is a UL grant of size zero bits.

Corresponding embodiments of a wireless device are also disclosed. In one embodiment, a wireless device for beam failure recovery is adapted to transmit, to a base station, a UL transmission comprising beam failure recovery information, where the UL transmission is associated with a particular HARQ process. The wireless device is further adapted to receive, from the base station, a UL grant for the particular HARQ process, where the UL grant comprises a new data indicator. The wireless device is further adapted to determine, based on the new data indicator comprised in the UL grant, that a beam failure recovery procedure related to the beam failure recovery information is complete.

In another embodiment, a wireless device for beam failure recovery comprises one or more transmitters, one or more receivers, and processing circuitry associated with the one or more transmitters and the one or more receivers. The processing circuitry is configured to cause the wireless device to transmit, to a base station, a UL transmission comprising beam failure recovery information, where the UL transmission is associated with a particular HARQ process. The processing circuitry is further configured to cause the wireless device to receive, from the base station, a UL grant for the particular HARQ process, where the UL grant comprises a new data indicator. The processing circuitry is further configured to cause the wireless device to determine, based on the new data indicator comprised in the UL grant, that a beam failure recovery procedure related to the beam failure recovery information is complete.

In one embodiment, the processing circuitry is further configured to cause the wireless device to, upon determining that the beam failure recovery procedure is complete, perform one or more actions associated with successful completion of the beam failure recovery procedure.

In one embodiment, the beam failure recovery procedure is an SCell beam failure recovery procedure.

In one embodiment, the processing circuitry is further configured to cause the wireless device to determine, based on the new data indicator comprised in the UL grant, that the beam failure recovery information was successfully received by the base station.

In one embodiment, the new data indicator is a bit in the UL grant that indicates that the UL grant schedules new data and not retransmitted data. In one embodiment, the new data indicator indicates that the UL grant schedules new data when a value of the bit is toggled.

In one embodiment, the beam failure recovery information comprises information indicating a cell of the beam failure and a new beam suitable for reestablishing the communication.

In one embodiment, the UL transmission comprising the beam failure recovery information is a MAC CE message.

In one embodiment, a computer program comprising instructions which, when executed on at least one processor, cause the at least one processor to carry out the method performed by a wireless device according to any of the embodiments disclosed herein. In one embodiment, a carrier containing the computer program of is provided, wherein the carrier is one of an electronic signal, an optical signal, a radio signal, or a computer readable storage medium.

In one embodiment, a non-transitory computer readable medium is provided, wherein the non-transitory computer readable medium comprises instructions executable by processing circuitry of a wireless device to thereby cause the wireless device to: transmit, to a base station, a UL transmission comprising beam failure recovery information where the UL transmission is associated with a particular HARQ process; receive, from the base station, a UL grant for the particular HARQ process, the uplink grant comprising a new data indicator; and determine, based on the new data indicator comprised in the UL grant, that a beam failure recovery procedure related to the beam failure recovery information is complete.

Embodiments of a method performed by a base station for beam failure recovery and corresponding embodiments of a base station are also disclosed. In one embodiment, a method performed by a base station for beam failure recovery comprises receiving, from a wireless device, a UL transmission comprising beam failure recovery information, where the UL transmission is associated with a particular HARQ process. The method further comprises transmitting, to the wireless device, a UL grant for the particular HARQ process, where the UL grant comprises a new data indicator. The UL grant for the particular HARQ process comprising the new data indicator is an indication that a beam failure recovery procedure related to the beam failure recovery information is complete.

In one embodiment, the beam failure recovery procedure is an SCell beam failure recovery procedure.

In one embodiment, the new data indicator is a bit in the UL grant that indicates that the UL grant schedules new data and not retransmitted data. In one embodiment, the new data indicator indicates that the UL grant schedules new data when a value of the bit is toggled.

In one embodiment, the beam failure recovery information comprises information indicating: a cell of the beam failure and a new beam suitable for reestablishing the communication.

In one embodiment, the UL transmission comprising the beam failure recovery information is a MAC CE message.

Corresponding embodiments of a base station are also disclosed. In one embodiment, a base station for beam failure recovery is adapted to receive, from a wireless device, a UL transmission comprising beam failure recovery information, where the uplink transmission is associated with a particular HARQ process. The base station is further adapted to transmit, to the wireless device, a UL grant for the particular HARQ process, where the UL grant comprises a new data indicator. The UL grant for the particular HARQ process comprises the new data indicator is an indication that a beam failure recovery procedure related to the beam failure recovery information is complete.

In another embodiment, a base station for beam failure recovery comprises processing circuitry configured to cause the base station to receive, from a wireless device, a UL transmission comprising beam failure recovery information, where the UL transmission is associated with a particular HARQ process. The processing circuitry is further configured to cause the base station to transmit, to the wireless device, a UL grant for the particular HARQ process, where the UL grant comprises a new data indicator. The UL grant for the particular HARQ process comprises the new data indicator is an indication that a beam failure recovery procedure related to the beam failure recovery information is complete.

In one embodiment, a computer program comprising instructions which, when executed on at least one processor, cause the at least one processor to carry out the method performed by a base station according to any of the embodiments disclosed herein. In one embodiment, a carrier containing the computer program is provided, wherein the carrier is one of an electronic signal, an optical signal, a radio signal, or a computer readable storage medium.

In one embodiment, a non-transitory computer readable medium comprises instructions executable by processing circuitry of a base station to thereby cause the base station to: receive, from a wireless device, a UL transmission comprising beam failure recovery information, the UL transmission being associated with a particular HARQ process; and transmit, to the wireless device, a UL grant for the particular HARQ process, the UL grant comprising a new data indicator; wherein the UL grant for the particular HARQ process comprising the new data indicator is an indication that a beam failure recovery procedure related to the beam failure recovery information is complete.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
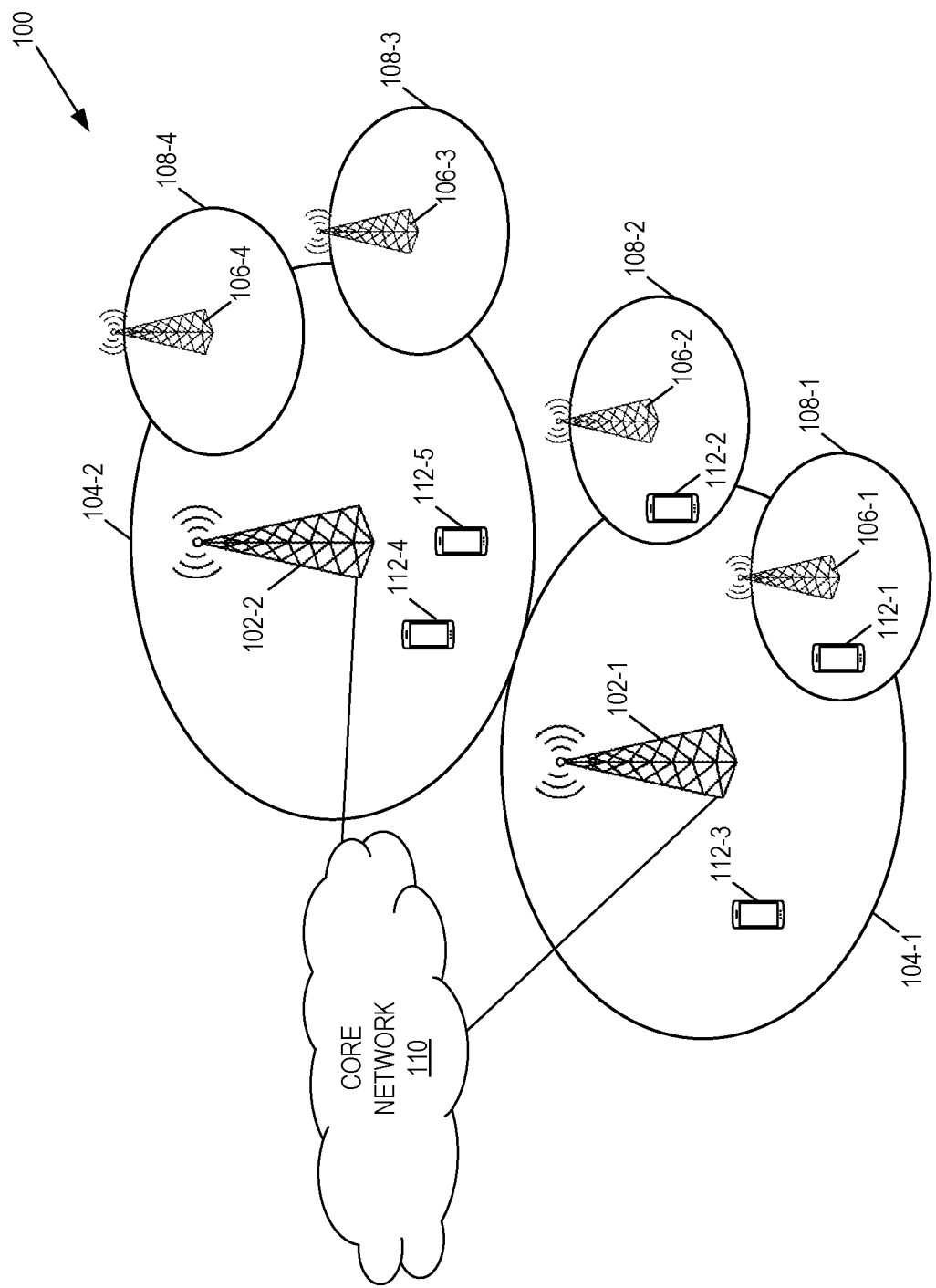
FIG. 1 illustrates one example of a cellular communications system in which embodiments of the present disclosure may be implemented.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" or "radio network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing a Access and Mobility Management Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the RAN or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell;" however, particularly with respect to 5G NR concepts, beams may be used instead of cells and, as such, it is important to note that the concepts described herein are equally applicable to both cells and beams.

There currently exist certain challenge(s) with respect to beam failure recovery. In particular, if the network does not receive the first transmission of the beam failure recovery information message, the network will at some point in time schedule a retransmission of the message. However, there is no way for the UE to know that the beam failure recovery message has been received by the network, since the uplink (UL) Hybrid Automatic Repeat Request (HARQ) transmission is not explicitly acknowledged. Therefore, the UE is not aware that the beam failure recovery procedure is successfully completed, and therefore cannot apply the correct procedures.

Certain aspects of the present disclosure and their embodiments may provide solutions to the aforementioned or other challenges. Systems and methods for beam failure recovery are described herein. These systems and methods are particularly beneficial for beam failure recovery in 3GPP NR; however, they are not limited thereto (e.g., they may be used in other types of wireless networks or cellular communications networks that perform beam failure recovery). As described below, in embodiments of the present disclosure, the beam failure recovery procedure is completed when the UE receives a UL grant for the HARQ process that was used to transmit the beam failure recovery information message, and where the UL grant indicates "new data." In other words, during beam failure recovery, the UE transmits a beam failure recovery information message using a particular HARQ process. Upon successfully receiving the beam failure recovery information message, the base station (e.g., gNB) responds with a UL grant comprising a "new data" indicator. At the UE, the UE receives the UL grant and interprets the "new data" indicator as an Acknowledgement (ACK) for the beam failure recovery information message. Based on this ACK, the UE performs one or more actions associated with successful completion of beam failure recovery (e.g., the UE discards measurements used for beam failure recovery).

Certain embodiments may provide one or more of the following technical advantage(s). By using embodiments of the solution described herein, the UE knows when the beam failure recovery procedure is completed.

FIG. 1 illustrates one example of a cellular communications system 100 in which embodiments of the present disclosure may be implemented. In the embodiments described herein, the cellular communications system 100 is preferably a 5G System (5GS) including a NR RAN, but is not limited thereto. In this example, the RAN includes base stations 102-1 and 102-2, which in 5G NR are referred to as gNBs, controlling corresponding (macro) cells 104-1 and 104-2. The base stations 102-1 and 102-2 are generally referred to herein collectively as base stations 102 and individually as base station 102. Likewise, the (macro) cells 104-1 and 104-2 are generally referred to herein collectively as (macro) cells 104 and individually as (macro) cell 104. The RAN may also include a number of low power nodes 106-1 through 106-4 controlling corresponding small cells 108-1 through 108-4. The low power nodes 106-1 through 106-4 can be small base stations (such as pico or femto base stations) or Remote Radio Heads (RRHs), or the like. Notably, while not illustrated, one or more of the small cells 108-1 through 108-4 may alternatively be provided by the base stations 102. The low power nodes 106-1 through 106-4 are generally referred to herein collectively as low power nodes 106 and individually as low power node 106. Likewise, the small cells 108-1 through 108-4 are generally referred to herein collectively as small cells 108 and individually as small cell 108. The cellular communications system 100 also includes a core network 110, which in the 5GS is referred to as the 5G Core (5GC). The base stations 102 (and optionally the low power nodes 106) are connected to the core network 110.

The base stations 102 and the low power nodes 106 provide service to wireless devices 112-1 through 112-5 in the corresponding cells 104 and 108. The wireless devices 112-1 through 112-5 are generally referred to herein collectively as wireless devices 112 and individually as wireless device 112. The wireless devices 112 are also sometimes referred to herein as UEs.

Now, a discussion of some example embodiments of the present disclosure will be provided. In one embodiment, a UE (e.g., UE 112) performs a beam failure recovery procedure in which the UE considers the beam failure recovery procedure complete when the UE receives a new UL grant for the HARQ process used for transmission of the beam failure recovery information message, and the UL grant indicates "new data." In some embodiments, the new UL grant indicating "new data" contains a UL grant of a minimum size larger than zero bits. In yet another embodiment, the new UL grant indicating "new data" contains a UL grant of size zero bits.

In other words, in one embodiment, a UE (e.g., UE 112) performs a beam failure recovery procedure in which the UE considers the beam failure recovery procedure complete when the UE receives a new UL grant for the HARQ process used for transmission of the beam failure recovery information message, and the UL grant comprises information that implicitly indicates that the beam failure recovery information message was successfully received by the base station (e.g., a base station 102 such as, e.g., a gNB). In some preferred embodiments, the information comprised in the UL grant that indicates that the beam failure recovery information message was successfully received by the base station is a "new data" indicator (e.g., one or more bits that explicitly indicate that the UL grant is for new data to be transmitted for the HARQ process rather than for a retransmission for the HARQ process). In some embodiments, the UL grant additionally or alternatively includes information that indicates that the UL grant is of a minimum size larger than zero bits. In some other embodiments, the UL grant additionally or alternatively includes information that indicates that the UL grant is a UL grant of size zero bits.

Figure 2:
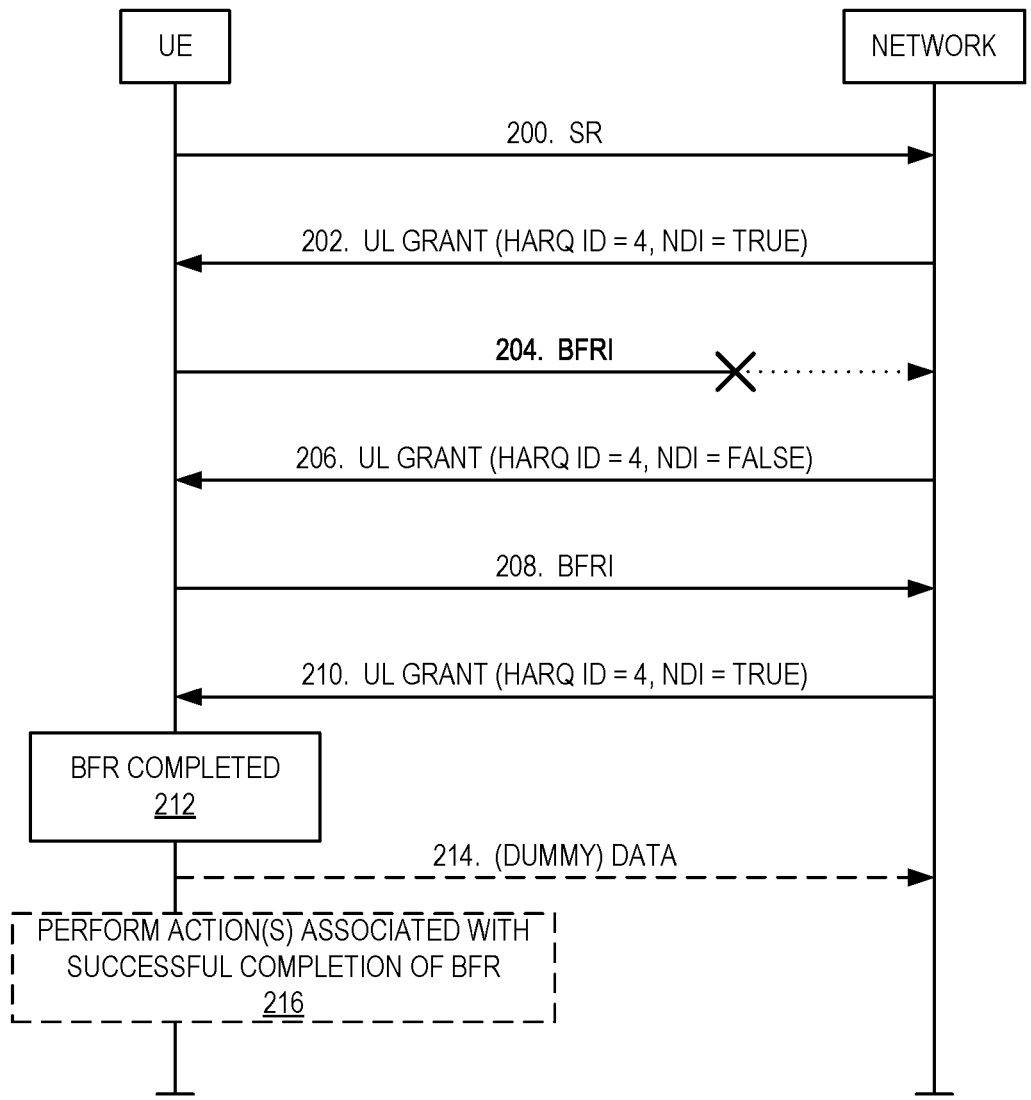
FIG. 2 illustrates a first example of the operation of a User Equipment (UE) and a network node (e.g., a base station) to perform a Secondary Cell (SCell) beam failure recovery procedure in accordance with some embodiments of the present disclosure.

In this regard, FIG. 2 illustrates the operation of a UE (e.g., a UE 112) and a network node (e.g., a base station 112 such as, e.g., a gNB) to perform a Secondary Cell (SCell) beam failure recovery procedure in accordance with some embodiments of the present disclosure. In this example, the UE does not have a UL grant, so the UE starts the beam failure recovery procedure by transmitting a Scheduling Request (SR) to the network node to get UL transmission resources (step 200). In response, the network node transmits and the UE receives a UL grant for a particular HARQ process (step 202). In this example, the HARQ process is a HARQ process having a HARQ Identifier (ID)=4. Also, a New Data Indicator (NDI) in the UL grant indicates that new data can be transmitted. This may be achieved by setting NDI to TRUE, or that the value of NDI is toggled, i.e. its value is different compared to when it was previously received. In the illustrated example, the NDI is set to TRUE to indicate that new data can be transmitted and set to FALSE to indicate that a retransmission is needed. However, as mentioned above, the NDI can alternatively be used to indicate that new data can be transmitted by toggling the value of the NDI as compared to its previous value. Using the UL grant, the UE transmits a Beam Failure Recovery Information (BFRI) message to the network node (step 204). As explained above, the BFRI message may be a MAC CE message that contains information about which SCell failed and information about a new suitable beam where the communication can be reestablished (e.g., information indicating the cell of the beam failure and a new beam suitable for reestablishing the communication). However, this initial transmission of the BFRI message fails, so the network node schedules a retransmission of the BFRI message (step 206). The network node schedules the retransmission of the BFRI message by sending a UL grant for the same HARQ process with the NDI indicating that new data should not be transmitted, which in this example is done by setting the NDI to FALSE.

In response to the UL grant of step 206, the UE transmits a retransmission of the BFRI message (step 208). In this example, the retransmission of the BFRI message successfully reaches the network node, so the network node acknowledges the reception by requesting new data for the corresponding HARQ process. In other words, the network node acknowledges reception of the retransmission of the BFRI message by sending a UL grant to the UE for the same HARQ process with the NDI indicating that new data can be transmitted, which in this example is done by setting the NDI to TRUE (step 210). At the UE, the UE receives the UL grant of step 210 and interprets the UL grant as an ACK for the retransmission of the BFRI message (step 212). The UE thus determines that a beam failure recovery procedure related to the BFRI is complete based on the NDI in the UL grant. Optionally, the UE transmits (e.g., "dummy") data to the network node in response to the UL grant of step 210 (step 214). In addition, the UE performs one or more actions associated with successful completion of the beam failure recovery procedure (step 216). For example, the UE may delete measurements associated with the beam failure recovery procedure.

Figure 3:
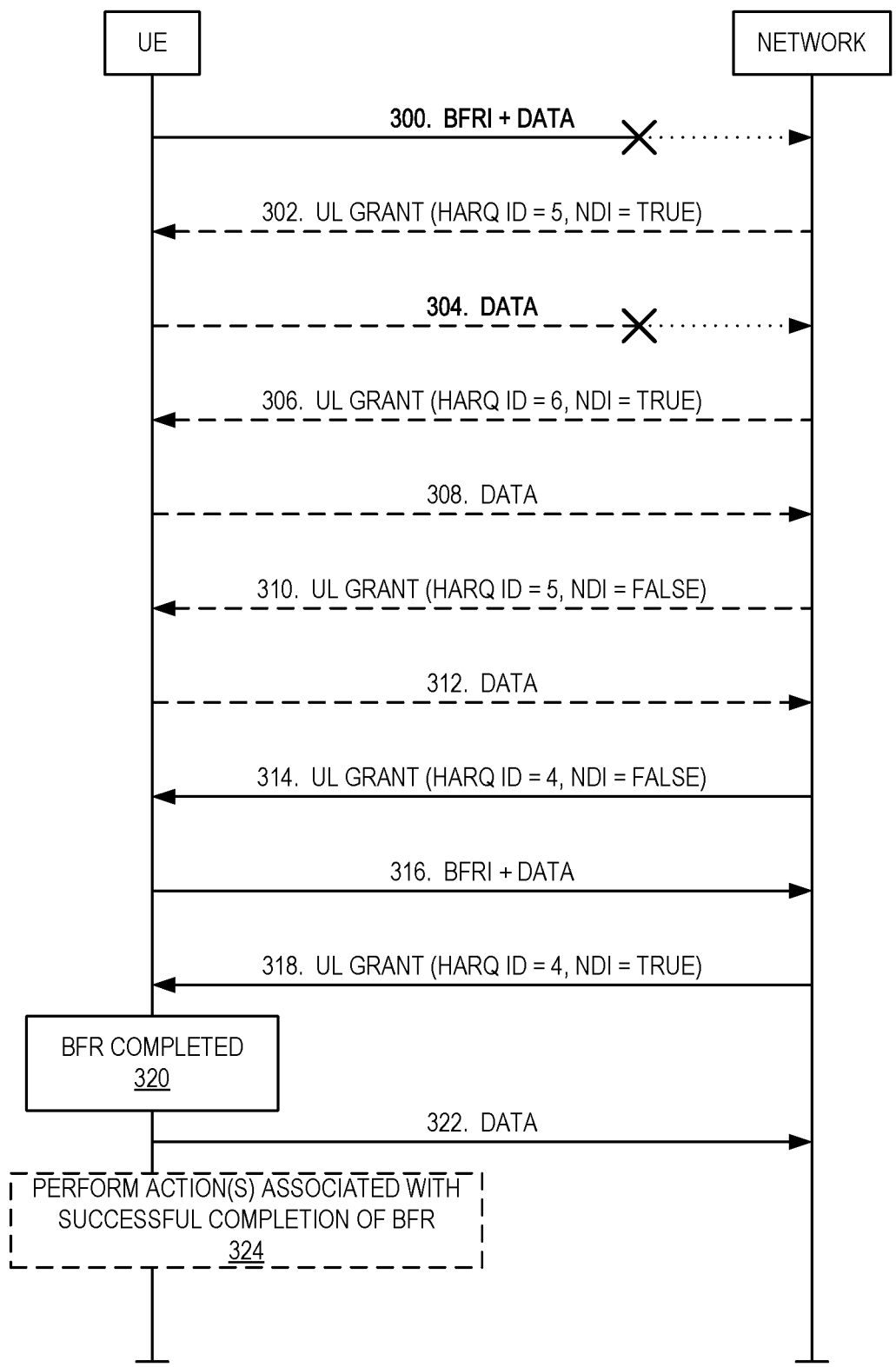
FIG. 3 illustrates a second example of the operation of a UE and a network node (e.g., a base station) to perform an SCell beam failure recovery procedure in accordance with some embodiments of the present disclosure.

FIG. 3 illustrates the operation of a UE (e.g., a UE 112) and a network node (e.g., a base station 112 such as, e.g., a gNB) to perform an SCell beam failure recovery procedure in accordance with some embodiments of the present disclosure. In the illustrated example, the NDI is set to TRUE to indicate that new data can be transmitted and set to FALSE to indicate that a retransmission is needed. However, as mentioned above, the NDI can alternatively be used to indicate that new data can be transmitted by toggling the value of the NDI as compared to its previous value. In this example, the UE has an ongoing data transmission and hence a UL grant, so the UE directly sends the BFRI message (e.g., the Medium Access Control (MAC) Control Element (CE) containing the BFRI) (step 300). The UE multiplexes the BFRI with other data from its ongoing data transmission. In this example, the initial transmission of the BFRI message is multiplexed with an ongoing data transmission for a HARQ process having HARQ ID=4. The initial transmission of the BFRI message fails, so the network node schedules a retransmission of the message (step 314). The network node schedules the retransmission of the BFRI message by sending a UL grant for the same HARQ process (HARQ process with HARQ ID=4 in this example) with the NDI indicating that new data should not be transmitted, which in this example is done by setting the NDI to FALSE.

In response to the UL grant of step 314, the UE transmits a retransmission of the data and the BFRI message (step 316). In this example, the retransmission successfully reaches the network node, so the network node acknowledges the reception by requesting new data for the corresponding HARQ process. In other words, the network node acknowledges reception of the retransmission of the BFRI message by sending a UL grant to the UE for the same HARQ process (HARQ ID=4) with the NDI indicating that new data should be transmitted, which in this example is done by setting the NDI to TRUE (step 318). At the UE, the UE receives the UL grant of step 318 and interprets the UL grant as an ACK for the retransmission of the BFRI message (step 320). The UE transmits data to the network node in response to the UL grant of step 318 (step 322). Optionally, the UE performs one or more actions associated with successful completion of the beam failure recovery procedure (step 324). For example, the UE may delete measurements associated with the beam failure recovery procedure.

Note that, in the example of FIG. 3, between the initial transmission of the BFRI and data by the UE in step 300 and transmission of the UL grant for the retransmission of the BFRI and data in step 314, the network sends UL grants associated with other HARQ processes (e.g., HARQ ID=5 and HARQ ID=6, in this example) and the UE responds with appropriate transmissions/retransmissions (steps 302 through 312). Note that steps 302 through 312 are optional.

Figure 4:
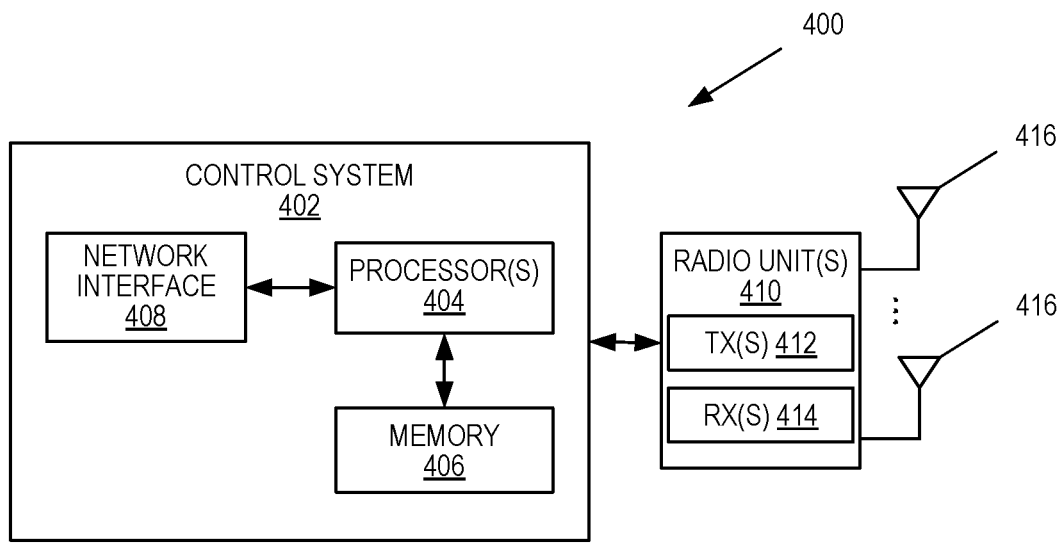
FIGS. 4 through 6 are schematic block diagrams of example embodiments of a base station.

FIG. 4 is a schematic block diagram of a base station 400 according to some embodiments of the present disclosure. The base station 400 may be, for example, a base station 102 or 106. As illustrated, the base station 400 includes a control system 402 that includes one or more processors 404 (e.g., Central Processing Units (CPUs), Application Specific Integrated Circuits (ASICs), Field Programmable Gate Arrays (FPGAs), and/or the like), memory 406, and a network interface 408. The one or more processors 404 are also referred to herein as processing circuitry. In addition, the base station 400 includes one or more radio units 410 that each includes one or more transmitters 412 and one or more receivers 414 coupled to one or more antennas 416. The radio units 410 may be referred to or be part of radio interface circuitry. In some embodiments, the radio unit(s) 410 is external to the control system 402 and connected to the control system 402 via, e.g., a wired connection (e.g., an optical cable). However, in some other embodiments, the radio unit(s) 410 and potentially the antenna(s) 416 are integrated together with the control system 402. The one or more processors 404 operate to provide one or more functions of a base station 400 as described herein (e.g., one or more functions of the base station/gNB/network node described above, e.g., with respect to FIGS. 2 and 3). In some embodiments, the function(s) are implemented in software that is stored, e.g., in the memory 406 and executed by the one or more processors 404.

Figure 5:
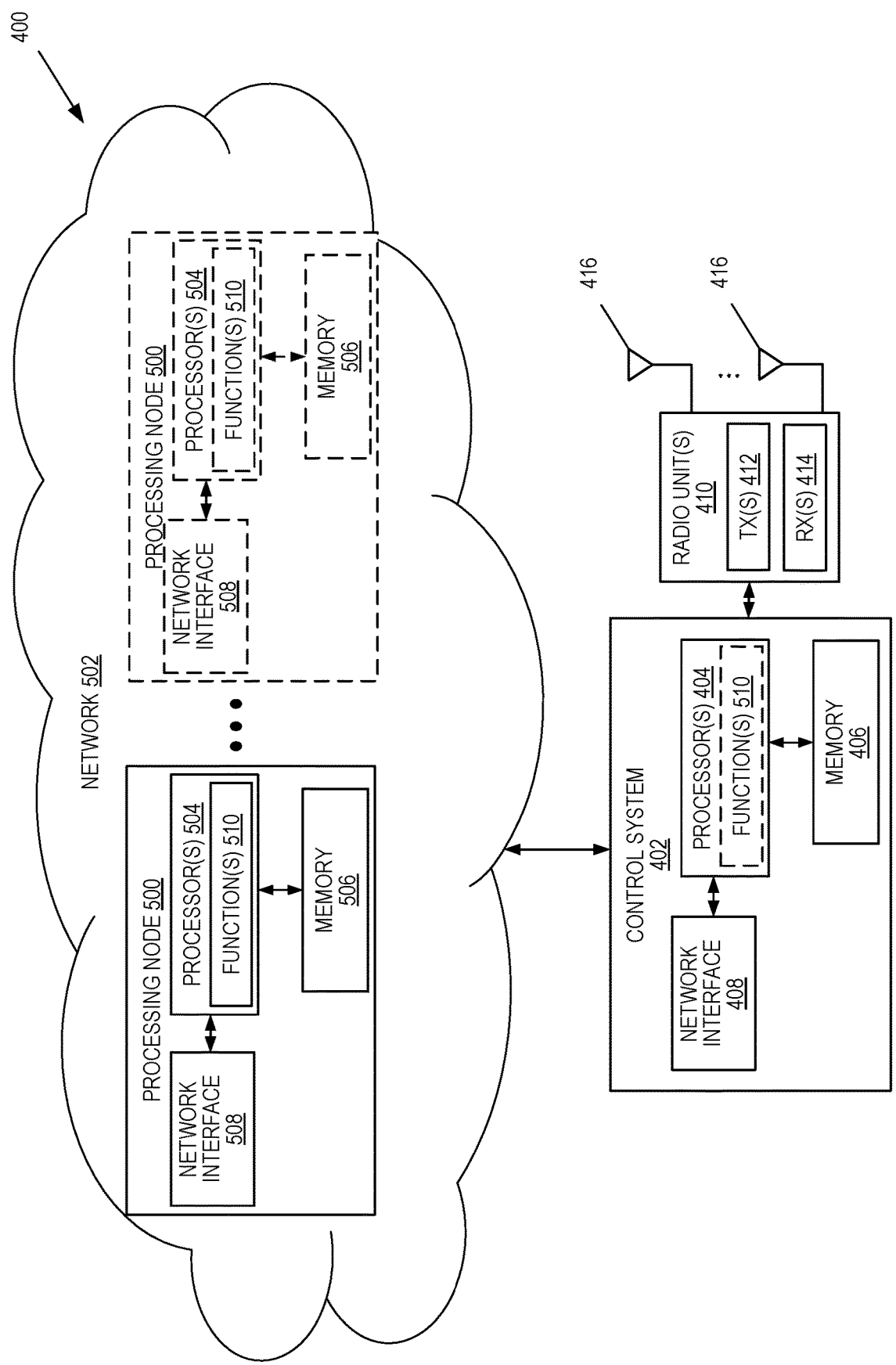

FIG. 5 is a schematic block diagram that illustrates a virtualized embodiment of the base station 400 according to some embodiments of the present disclosure. This discussion is equally applicable to other types of network nodes. Further, other types of network nodes may have similar virtualized architectures.

As used herein, a "virtualized" base station is an implementation of the base station 400 in which at least a portion of the functionality of the base station 400 is implemented as a virtual component(s) (e.g., via a virtual machine(s) executing on a physical processing node(s) in a network(s)). As illustrated, in this example, the base station 400 includes the control system 402 that includes the one or more processors 404 (e.g., CPUs, ASICs, FPGAs, and/or the like), the memory 406, and the network interface 408 and the one or more radio units 410 that each includes the one or more transmitters 412 and the one or more receivers 414 coupled to the one or more antennas 416, as described above. The control system 402 is connected to the radio unit(s) 410 via, for example, an optical cable or the like. The control system 402 is connected to one or more processing nodes 500 coupled to or included as part of a network(s) 502 via the network interface 408. Each processing node 500 includes one or more processors 504 (e.g., CPUs, ASICs, FPGAs, and/or the like), memory 506, and a network interface 508.

In this example, functions 510 of the base station 400 described herein (e.g., one or more functions of the base station/gNB/network node described above, e.g., with respect to FIGS. 2 and 3) are implemented at the one or more processing nodes 500 or distributed across the control system 402 and the one or more processing nodes 500 in any desired manner. In some particular embodiments, some or all of the functions 510 of the base station 400 described herein are implemented as virtual components executed by one or more virtual machines implemented in a virtual environment(s) hosted by the processing node(s) 500. As will be appreciated by one of ordinary skill in the art, additional signaling or communication between the processing node(s) 500 and the control system 402 is used in order to carry out at least some of the desired functions 510. Notably, in some embodiments, the control system 402 may not be included, in which case the radio unit(s) 410 communicate directly with the processing node(s) 500 via an appropriate network interface(s).

In some embodiments, a computer program including instructions which, when executed by at least one processor, causes the at least one processor to carry out the functionality of base station 400 (e.g., one or more functions of the base station/gNB/network node described above, e.g., with respect to FIGS. 2 and 3) or a node (e.g., a processing node 500) implementing one or more of the functions 510 of the base station 400 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 6:
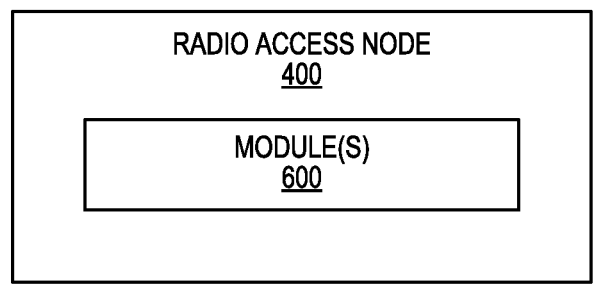

FIG. 6 is a schematic block diagram of the base station 400 according to some other embodiments of the present disclosure. The base station 400 includes one or more modules 600, each of which is implemented in software. The module(s) 600 provide the functionality of the base station 400 described herein (e.g., one or more functions of the base station/gNB/network node described above, e.g., with respect to FIGS. 2 and 3). This discussion is equally applicable to the processing node 500 of FIG. 5 where the modules 600 may be implemented at one of the processing nodes 500 or distributed across multiple processing nodes 500 and/or distributed across the processing node(s) 500 and the control system 402.

Figure 7:
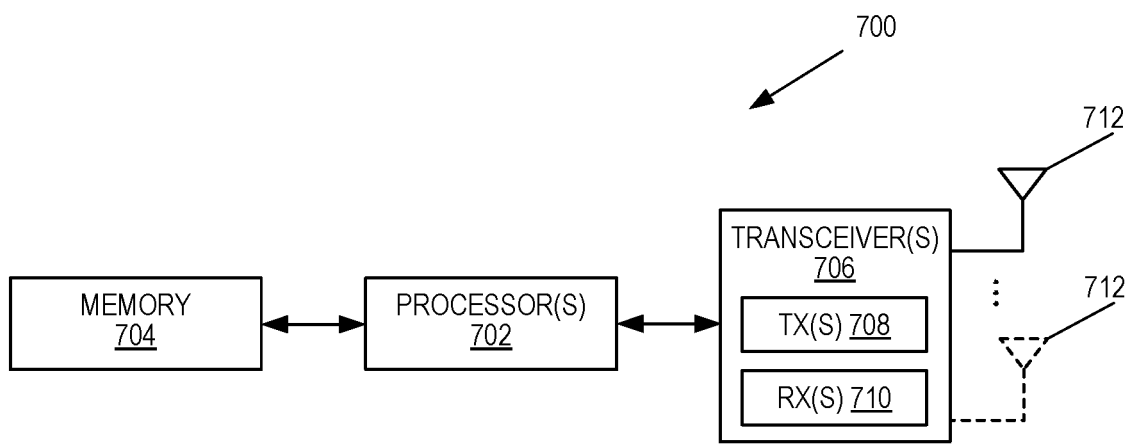
FIGS. 7 and 8 are schematic block diagrams of example embodiments of a wireless device (e.g., a UE).

FIG. 7 is a schematic block diagram of a UE 700 according to some embodiments of the present disclosure. As illustrated, the UE 700 includes one or more processors 702 (e.g., CPUs, ASICs, FPGAs, and/or the like), memory 704, and one or more transceivers 706 each including one or more transmitters 708 and one or more receivers 710 coupled to one or more antennas 712. The transceiver(s) 706 includes radio-front end circuitry connected to the antenna(s) 712 that is configured to condition signals communicated between the antenna(s) 712 and the processor(s) 702, as will be appreciated by on of ordinary skill in the art. The processors 702 are also referred to herein as processing circuitry. The transceivers 706 are also referred to herein as radio circuitry. In some embodiments, the functionality of the UE 700 described above (e.g., one or more functions of the UE described above, e.g., with respect to FIGS. 2 and 3) may be fully or partially implemented in software that is, e.g., stored in the memory 704 and executed by the processor(s) 702. Note that the UE 700 may include additional components not illustrated in FIG. 7 such as, e.g., one or more user interface components (e.g., an input/output interface including a display, buttons, a touch screen, a microphone, a speaker(s), and/or the like and/or any other components for allowing input of information into the UE 700 and/or allowing output of information from the UE 700), a power supply (e.g., a battery and associated power circuitry), etc.

In some embodiments, a computer program including instructions which, when executed by at least one processor, causes the at least one processor to carry out the functionality of the UE 700 according to any of the embodiments described herein (e.g., one or more functions of the UE described above, e.g., with respect to FIGS. 2 and 3) is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 8:
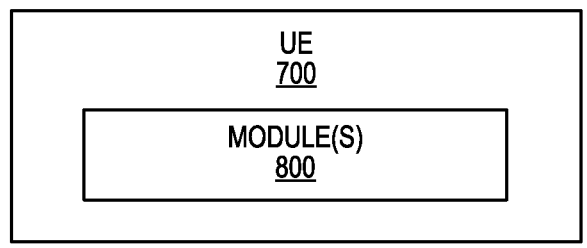

FIG. 8 is a schematic block diagram of the UE 700 according to some other embodiments of the present disclosure. The UE 700 includes one or more modules 800, each of which is implemented in software. The module(s) 800 provide the functionality of the UE 700 described herein (e.g., one or more functions of the UE described above, e.g., with respect to FIGS. 2 and 3).

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like.

The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some example embodiments of the present disclosure are as follows:

Group A Embodiments

Embodiment 1: A method performed by a wireless device for beam failure recovery, the method comprising: transmitting (208, 316), to a base station, an uplink transmission comprising beam failure recovery information, the uplink transmission being associated with a particular HARQ process; receiving (210, 318), from the base station, an uplink grant for the particular HARQ process, the uplink grant comprising information that (e.g., implicitly) indicates that the uplink transmission comprising the beam failure recovery information was successfully received by the base station; and determining (212, 320), based on information comprised in the uplink grant for the particular HARQ process, that the beam failure recovery information was successfully received by the base station and that a respective beam failure recovery procedure is complete.

Embodiment 2: The method of embodiment 1 wherein the information that indicates that the uplink transmission comprising the beam failure recovery information was successfully received by the base station comprises: a new data indicator comprised in the uplink grant.

Embodiment 3: The method of embodiment 1 or 2 wherein the information that indicates that the uplink transmission comprising the beam failure recovery information was successfully received by the base station comprises: information that indicates that a size of the uplink grant is a minimum size.

Embodiment 4: The method of embodiment 1 or 2 wherein the information that indicates that the uplink transmission comprising the beam failure recovery information was successfully received by the base station comprises: information that indicates that a size of the uplink grant is zero bits.

Embodiment 5: The method of any one of embodiments 1 to 4 further comprising, upon determining that the beam failure recovery procedure is complete, performing (216, 324) one or more actions that are appropriate for successful completion of the beam failure recovery procedure.

Embodiment 6: The method of any one of embodiments 1 to 5 wherein the beam failure recovery procedure is a secondary cell beam failure recovery procedure.

Group B Embodiments

Embodiment 7: A wireless device for beam failure recovery, the wireless device comprising: processing circuitry configured to perform any of the steps of any of the Group A embodiments; and power supply circuitry configured to supply power to the wireless device.

Embodiment 8: A User Equipment, UE, for beam failure recovery, the UE comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
5GC Fifth Generation Core
5GS Fifth Generation System
ACK Acknowledgement
AMF Access and Mobility Management Function
ASIC Application Specific Integrated Circuit
AUSF Authentication Server Function
BFRI Beam Failure Recovery Information
CC Component Carrier
CE Control Element
CPU Central Processing Unit
CRC Cyclic Redundancy Check
DCI Downlink Control Information
DL Downlink
DL-SCH Downlink Shared Channel
DSP Digital Signal Processor
eNB Enhanced or Evolved Node B
FPGA Field Programmable Gate Array
gNB New Radio Base Station
HARQ Hybrid Automatic Repeat Request
HSS Home Subscriber Server
ID Identifier
LCID Logical Channel Identifier
LTE Long Term Evolution
MAC Medium Access Control
MME Mobility Management Entity
MTC Machine Type Communication
NACK Negative Acknowledgement
NDI New Data Indicator
NEF Network Exposure Function
NF Network Function
NR New Radio
NRF Network Function Repository Function
NSSF Network Slice Selection Function
PCell Primary Cell
PCF Policy Control Function
PDCCH Physical Downlink Control Channel
P-GW Packet Data Network Gateway
PRACH Physical Random Access Channel
PUSCH Physical Uplink Shared Channel
RAM Random Access Memory
RAN Radio Access Network
ROM Read Only Memory RRH Remote Radio Head
RS Reference Signal
RX Receive
SCEF Service Capability Exposure Function
SCell Secondary Cell
SMF Session Management Function
SR Scheduling Request
TS Technical Specification
TX Transmit
UDM Unified Data Management
UE User Equipment
UL Uplink
UL-SCH Uplink Shared Channel
UPF User Plane Function Those skilled in the art will recognize improvements and modifications to the embodiments of the present disclosure. All such improvements and modifications are considered within the scope of the concepts disclosed herein.

What is claimed is:

1. A method performed by a wireless device for beam failure recovery, the method comprising:
transmitting, to a base station, an uplink transmission comprising beam failure recovery information, the uplink transmission being associated with a particular Hybrid Automatic Repeat Request, HARQ, process;
receiving, from the base station, an uplink grant for the particular HARQ process, the uplink grant comprising a new data indicator that is set to TRUE; and
determining, based on the new data indicator comprised in the uplink grant, that a beam failure recovery procedure related to the beam failure recovery information is complete independent of whether the new data indicator is toggled.

2. The method according to claim 1, further comprising upon determining that the beam failure recovery procedure is complete:
performing one or more actions associated with successful completion of the beam failure recovery procedure.

3. The method according to claim 1, wherein the beam failure recovery procedure is a secondary cell beam failure recovery procedure.

4. The method according to claim 1, further comprising determining, based on the new data indicator comprised in the uplink grant, that the beam failure recovery information was successfully received by the base station.

5. The method according to claim 1, wherein the new data indicator is a bit in the uplink grant that indicates that the uplink grant schedules new data and not retransmitted data.

6. The method according to claim 5, wherein the new data indicator indicates that the uplink grant schedules new data when a value of the bit is toggled.

7. The method according to claim 1, wherein the beam failure recovery information comprises information indicating: a cell of the beam failure and a new beam suitable for reestablishing the communication.

8. The method according to claim 1, wherein the uplink transmission comprising the beam failure recovery information is a Medium Access Control, MAC, Control Element, CE, message.

9. The method according to claim 1, wherein the uplink grant is an uplink grant of a predefined minimum size larger than zero bits.

10. The method according to claim 1, wherein the uplink grant is an uplink grant of size zero bits.

11. A wireless device for beam failure recovery, the wireless device comprising:
one or more transmitters;
one or more receivers; and
processing circuitry associated with the one or more transmitters and the one or more receivers, the processing circuitry configured to cause the wireless device to:
transmit, to a base station, an uplink transmission comprising beam failure recovery information, the uplink transmission being associated with a particular Hybrid Automatic Repeat Request, HARQ, process;
receive, from the base station, an uplink grant for the particular HARQ process, the uplink grant comprising a new data indicator that is set to TRUE; and
determine, based on the new data indicator comprised in the uplink grant, that a beam failure recovery procedure related to the beam failure recovery information is complete independent of whether the new data indicator is toggled.

12. The wireless device of claim 11, wherein the processing circuitry (702) is further configured to cause the wireless device to, upon determining that the beam failure recovery procedure is complete:
perform one or more actions associated with successful completion of the beam failure recovery procedure.

13. The wireless device of claim 11, wherein the beam failure recovery procedure is a secondary cell beam failure recovery procedure.

14. The wireless device of claim 11, wherein the processing circuitry is further configured to cause the wireless device to determine, based on the new data indicator comprised in the uplink grant, that the beam failure recovery information was successfully received by the base station.

15. The wireless device of claim 11, wherein the new data indicator is a bit in the uplink grant that indicates that the uplink grant schedules new data and not retransmitted data.

16. The wireless device of claim 15, wherein the new data indicator indicates that the uplink grant schedules new data when a value of the bit is toggled.

17. The wireless device of claim 11, wherein the beam failure recovery information comprises information indicating: a cell of the beam failure and a new beam suitable for reestablishing the communication.

18. The wireless device of claim 11, wherein the uplink transmission comprising the beam failure recovery information is a Medium Access Control, MAC, Control Element, CE, message.

19. A method performed by a base station for beam failure recovery, the method comprising:
receiving, from a wireless device, an uplink transmission comprising beam failure recovery information, the uplink transmission being associated with a particular Hybrid Automatic Repeat Request, HARQ, process; and
transmitting, to the wireless device, an uplink grant for the particular HARQ process, the uplink grant comprising a new data indicator that is set to TRUE;
wherein the uplink grant for the particular HARQ process comprising the new data indicator is an indication that a beam failure recovery procedure related to the beam failure recovery information is complete independent of whether the new data indicator is toggled.

20. The method according to claim 19, wherein the beam failure recovery procedure is a secondary cell beam failure recovery procedure.

21. The method according to claim 19, wherein the new data indicator is a bit in the uplink grant that indicates that the uplink grant schedules new data and not retransmitted data.

22. The method according to claim 21, wherein the new data indicator indicates that the uplink grant schedules new data when a value of the bit is toggled.

23. The method according to claim 19, wherein the beam failure recovery information comprises information indicating: a cell of the beam failure and a new beam suitable for reestablishing the communication.

24. The method according to claim 19, wherein the uplink transmission comprising the beam failure recovery information is a Medium Access Control, MAC, Control Element, CE, message.

25. A base station for beam failure recovery, the base station comprising processing circuitry configured to cause the base station to:
    receive, from a wireless device, an uplink transmission comprising beam failure recovery information, the uplink transmission being associated with a particular Hybrid Automatic Repeat Request, HARQ, process; and
    transmit, to the wireless device, an uplink grant for the particular HARQ process, the uplink grant comprising a new data indicator that is set to TRUE;
    wherein the uplink grant for the particular HARQ process comprising the new data indicator is an indication that a beam failure recovery procedure related to the beam failure recovery information is complete independent of whether the new data indicator is toggled.

26. A method performed by a wireless device for beam failure recovery, the method comprising:
    transmitting, to a base station, an uplink transmission comprising beam failure recovery information, the uplink transmission being associated with a particular Hybrid Automatic Repeat Request, HARQ, process;
    receiving, from the base station, an uplink grant for the particular HARQ process, the uplink grant comprising a new data indicator that is toggled or set to TRUE;
    determining, based on the new data indicator comprised in the uplink grant, that a beam failure recovery procedure related to the beam failure recovery information is complete; and
    discarding a measurement for beam failure recovery in response to determining that the beam failure recovery procedure is complete.

* * * * *

UNITED STATES PATENT AND TRADEMARK OFFICE
CERTIFICATE OF CORRECTION

PATENT NO. : 11,133,979 B2
APPLICATION NO. : 16/990340
DATED : September 28, 2021
INVENTOR(S) : Tidestav Page 1 of 1

It is certified that error appears in the above-identified patent and that said Letters Patent is hereby corrected as shown below:

In the Specification

In Column 2, Line 51, delete "(UL-SCH or DL-SCH)" and insert -- (DL-SCH or UL -SCH) --, therefor.

In Column 12, Line 24, delete "by on of" and insert -- by one of --, therefor.

In the Claims

In Column 16, Line 21, in Claim 12, delete "circuitry (702)" and insert -- circuitry --, therefor.

Signed and Sealed this
Nineteenth Day of April, 2022

Katherine Kelly Vidal
*Director of the United States Patent and Trademark Office*